United States Patent [19]

Burkart

[11] 3,763,827

[45] Oct. 9, 1973

[54] LIVESTOCK LOADING CHUTE

[76] Inventor: Edward J. Burkart, 705 Summit Ave., Connersville, Ind. 47331

[22] Filed: Jan. 28, 1972

[21] Appl. No.: 221,535

[52] U.S. Cl. .......................... 119/82, 214/85, 296/61
[51] Int. Cl. ............................................. B60p 1/52
[58] Field of Search .................. 119/82, 99; 214/85; 296/61

[56] References Cited
UNITED STATES PATENTS
2,822,940   2/1958   Kopaska ............................... 214/85
1,384,713   7/1921   Stephens ............................ 119/82 X Primary Examiner—Russell R. Kinsey
Assistant Examiner—J. A. Oliff
Attorney—Robert E. Leblanc et al.

[57] ABSTRACT

A loading chute primarily for loading livestock on a truck is presented. The chute includes a ramp with detachable sides and twin support members pivotally connected adjacent the forward end of the ramp and slidably retained in a track mounted beneath the truck bed. When in the loading position the forward end of the ramp abuts the end of the truck bed while the rear end rests on the ground. Vertical support therefor is provided by the supporting members and the track. When the chute is disassembled the sides are removed and attached to the sides of the truck. The ramp is then pivoted about the support members into a horizontal position and retracted into a storage area beneath the truck bed between the rails of the track.

8 Claims, 8 Drawing Figures

PATENTED OCT 9 1973 3,763,827

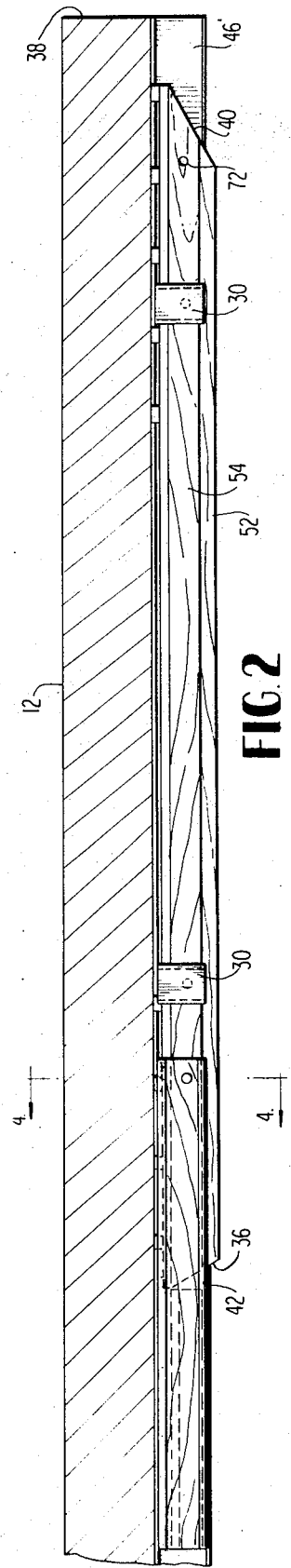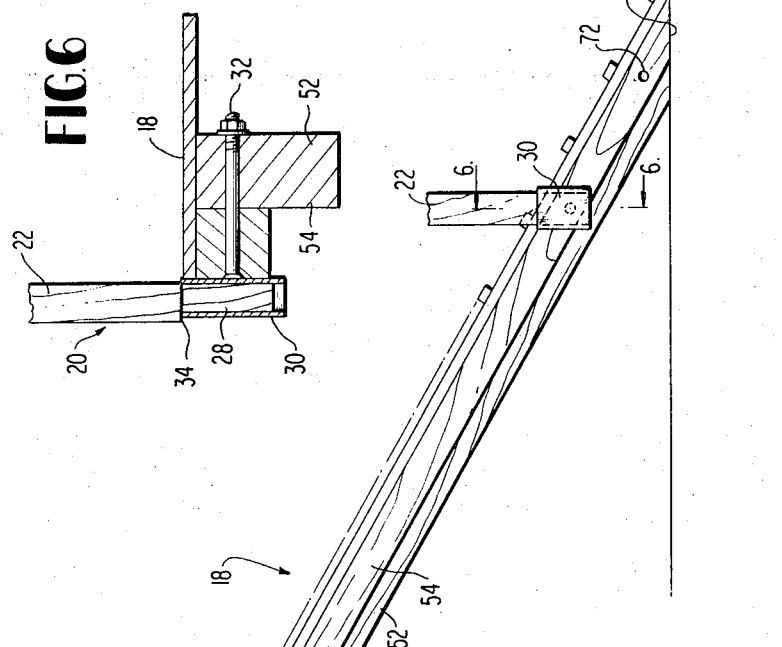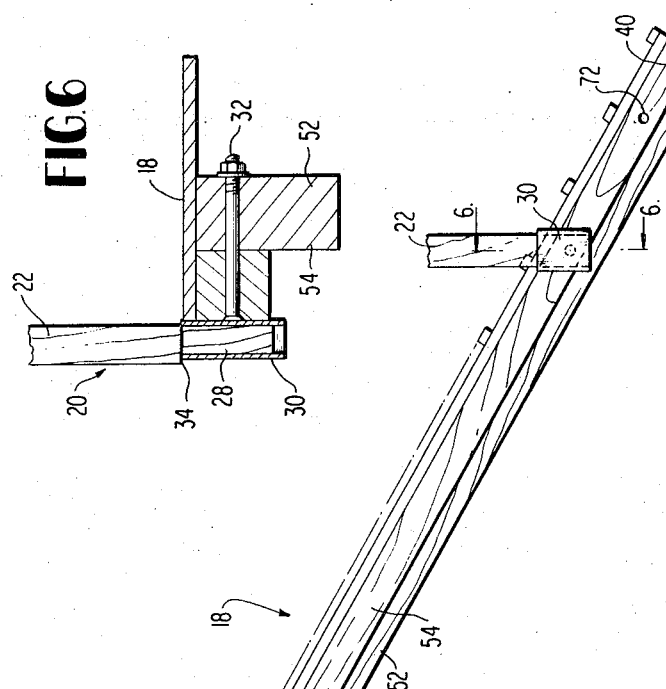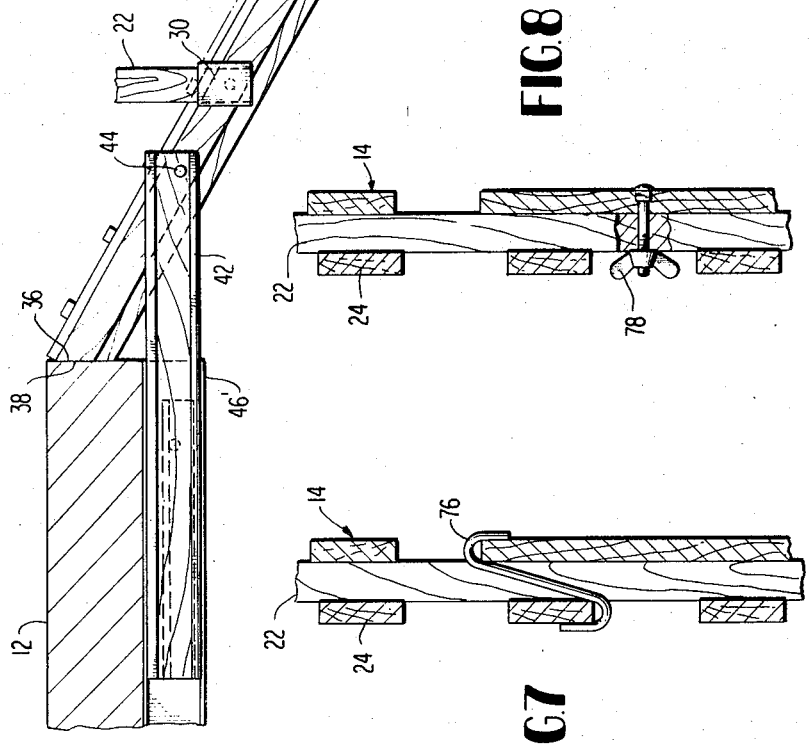

LIVESTOCK LOADING CHUTE

This invention relates to loading chutes and in particular to a portable loading chute for a truck. The chute of this invention is normally carried beneath the truck bed, but may be withdrawn therefrom and easily and quickly assembled for use.

A variety of portable loading ramps transportable in or under a truck bed have been developed in an attempt to provide a means to facilitate loading thereof. These ramps or chutes typically are constructed of wood or steel, and are retained in the loading position by hook members at the forward end which are engageable with the truck bed.

A ramp carried on the truck bed, when not in use, is obviously undesirable because it limits the storage space available. In addition, when certain types of cargo such as livestock are to be transported, the ramp must be left at a loading site, and the truck must then return for its loading ramp after the livestock are delivered.

Chutes are also known which are mounted on wheels to be towed by the truck. These chutes, however, are cumbersome and unwieldy. In addition, a towed chute undesirably limits where the truck may travel, and therefore, the versatility of its cargo transporting ability.

Retractable ramps carried beneath the truck bed have also been developed. These ramps do not limit the storage space in the truck and are therefore more desirable. These ramps, while not limiting the truck's versatility in transporting cargo, require an undue amount of physical exertion to assemble into the loading position. After the ramp is withdrawn from its storage area beneath the truck bed the hooked end thereon must be raised to engage the truck bed. This feat normally requires at least two men or a jack or other specialized mechanical apparatus to accomplish, due to the weight of the ramp.

Typically, small, light chutes are unsuitable for loading heavy cargo or livestock, and many farms do not have permanent loading chutes constructed. Therefore, livestock trucks should be equipped with a heavy duty ramp which preferably may be assembled by the driver alone and which may be conveniently stored therein when not in use.

The device of this invention solves the aforementioned problems in a portable, retractable ramp with separate sidewalls which may be easily attached thereto to form a loading chute. The ramp of this invention is pivotally mounted between twin support members which in turn are slidably retained in a horizontal track disposed beneath the truck bed. The track then defines a storage area for the ramp when it is not in use.

To assemble the ramp in a loading position the ramp is fully withdrawn from beneath the truck bed, leaving only the distal portion of the supporting members in the track. The ramp is then permitted to pivot about its connection with the supporting members until one end rests on the ground and the forward end thereof abuts the rear end of the truck bed. Sidewalls may then be attached if desired. The hook members which engage the truck bed in conventional ramps for vertical support are then eliminated in the device of this invention. Vertical support for the ramp is provided instead by the horizontal support members. A force acting downwardly on the ramp is then supported by the horizontal support members acting through their respective track rails.

Accordingly, the need for lifting the end of the ramp during assembly is eliminated. When the ramp is withdrawn from beneath the truck bed its weight causes it to pivot from a horizontal to an inclined position. This pivotal action stems from the disposition of the connection between the supporting members and the ramp whereby the pivotal connection is spaced from the forward end of the ramp and between the said end and the center of gravity thereof.

When the ramp is to be returned to the storage area beneath the truck bed the rear end is lifted to cause the ramp to pivot from an inclined to a horizontal position and the ramp and supporting members are then retracted along the track into the storage area beneath the truck bed and between the rail members of the track. The ramp is then retained in the storage position by a separate attachment connecting the rear end of the ramp and the rear end of the track.

It must be emphasized, however, that by spacing the pivotal connection between the ramp and the supporting members longitudinally from the forward end of the ramp toward the center of gravity thereof, the effective weight to be lifted when the chute is disassembled is less than the total weight of the ramp. Therefore, the position of the pivotal connection between the ramp and the supporting members facilitates both assembly and disassembly of the chute and functions to permit performance of these actions by a single operator.

The sidewalls which with the ramp form the loading chute of this invention include a plurality of uprights interconnected by a plurality of lateral supports. Preferably two tubular sleeves are mounted at each side of the ramp and two tab members depend from the lower surface of each side wall so that the walls may be readily mounted on the ramp by inserting the tabs into the sleeves.

In addition, the sleeves, in the preferred embodiment, are pivotally mounted on the ramp sides and the uprights and lateral supports are pivotally interconnected so that the walls are movable relative to the ramp from a position wherein the uprights are perpendicular to the ramp to a position wherein the uprights are perpendicular to the horizontal plane containing the truck bed.

When the sidewalls are not in use they may be attached by S-shaped hangers, wing bolts, or any other well known means to the side of the truck.

Accordingly, it is an object of this invention to provide a loading chute for a truck which may be retracted and carried beneath the truck bed, and which can be quickly and easily assembled into a loading position.

It is another object to provide a horizontally slidable truck loading ramp mounted in a track affixed beneath the truck bed which may be withdrawn from beneath the bed and permitted to pivot into a loading position by a single operator.

It is still another object to provide a portable loading chute for a truck including a ramp having support members pivotally connected thereto at a point between the forward end and the center of gravity of said ramp, said supports being slidably retained in a track mounted beneath the truck bed so that when the ramp is withdrawn from beneath the truck and disposed with one end abutting the end of the truck bed and the other end resting on the ground, vertical support for the ramp is provided by the supporting members and the track.

It is yet another object to provide a portable loading chute having detachable sidewalls, a ramp adapted to abut the end of the bed and rest on the ground, and vertical supporting members connecting the ramp and a track mounted beneath the truck bed whereby when said ramp is not in use it may be retracted with the supporting members beneath the truck bed along the track and retained in a storage area therein.

These and other objects will become readily apparent with reference to the drawings and following description wherein:

FIG. 2 is a fragmentary view partly in section and partly in elevation of the ramp of this invention retracted into the storage position with a portion of the track removed;

FIG. 3 is a fragmentary view partly in section and partly in elevation of the ramp of this invention assembled into the loading position;

FIG. 6 is a fragmentary view in partial section taken along line 6—6 of FIG. 3;

FIG. 7 is a fragmentary view in partial section taken along line 7—7 of FIG. 1;

FIG. 8 is a fragmentary view in partial section, similar to FIG. 7, showing an alternate means for mounting the sidewall for the chute of this invention on a truck.

Figure 1:
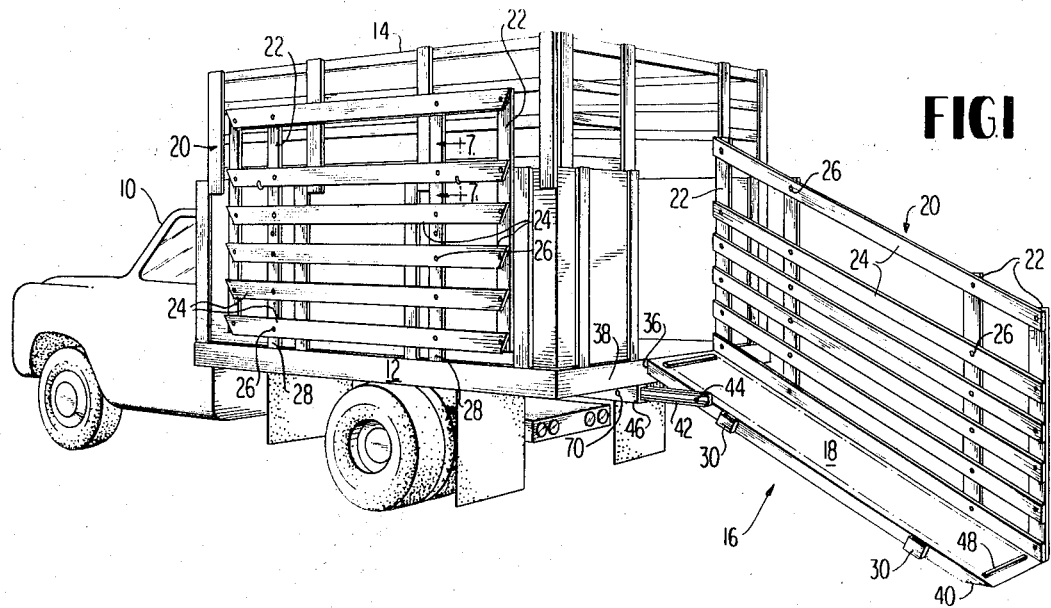
FIG. 1 is a perspective view of the chute of this invention mounted on a truck and assembled in the loading position with one sidewall removed.

With reference to the drawings, FIG. 1 illustrates a truck 10 having a bed 12 and walls 14 attached thereto. FIG. 1 also illustrates the loading chute 16 of this invention partially assembled in the loading position. Chute 16 includes a ramp 18 and right and left sidewalls 20. Each sidewall 20 includes a plurality of upright supports 22 and a plurality of lateral crossmembers 24. Members 22 and 24 are pivotally interconnected by any conventional means 26 such as bolts or rivets.

The lower surface of each sidewall 20 mounts, preferably, two depending tab members 28 which may be merely extensions of the two uprights 22. Two rectangular sleeves 30 are pivotally mounted on each side of ramp 18. To assemble sidewalls 20 on ramp 18 tab members 28 are merely inserted in sleeves 30.

As shown in FIG. 2, sleeves 30 are normally disposed perpendicular to the horizontal plane containing ramp 18. However, when sidewalls 20 are mounted on ramp 18 as shown in FIG. 1, it will be desirable to pivot uprights 22 and sleeves 30 relative to ramp 18 until the uprights 22 are disposed perpendicular to the horizontal plane containing the truck bed 12. For this reason in the preferred embodiment of this invention rectangular sleeves 30 are pivotally mounted on ramp 18 and upright supports 22 and lateral members 24 are pivotally interconnected.

FIG. 6 illustrates a sidewall upright 22 mounted on ramp 18 with a tab member 28 inserted in sleeve 30. Sleeve 30 may be pivotally connected to ramp 18 by any conventional means 32 such as the bolt shown. The lower surface of sidewall 20 may have a shoulder 34 thereon to stop downward displacement of tab member 28 in sleeve 30 and to retain tab 28 in the sleeve 30.

When ramp 18 is in the loading position of FIG. 1 the forward end 36 abuts the rear end 38 of the truck bed 12. The rear end 40 of ramp 18 is adapted to rest on the ground. Ramp 18 is retained in the loading position by twin support members 42 pivotally mounted by any conventional means 44, such as a bolt, at each side of ramp 18. Support members 42 are in turn retained in track 46. Track 46 is mounted on the lower surface of bed 12 by any conventional means (not shown).

Figure 4:
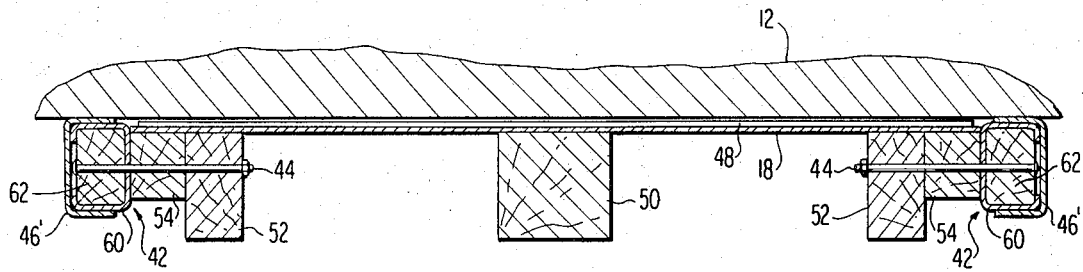
FIG. 4 is a fragmentary sectional view taken along line 4—4 of FIG. 2.
Figure 5:
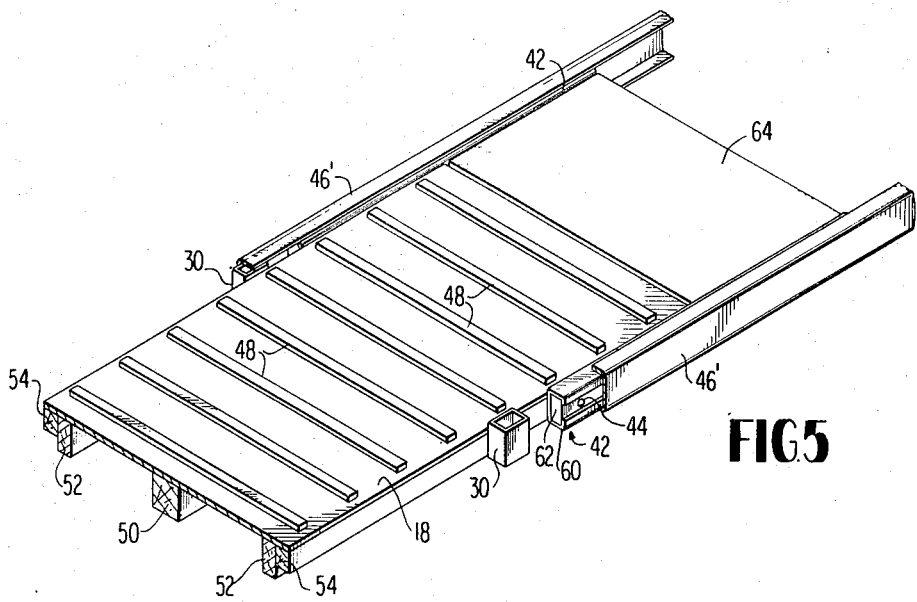
FIG. 5 is a fragmentary perspective view of the ramp of this invention.

With attention to FIGS. 4, 5 and 6, ramp 18 may have treads 48 on the upper surface thereof. The lower surface of ramp 18 is supported by a central longitudinal brace 50 and right and left longitudinal braces 52 affixed thereto by any conventional means (not shown). Supporting members 54 extend along the outer surfaces of right and left braces 52 and support the extreme edge portion of ramp 18. As shown in FIG. 6 the mounting means 32 connects sleeves 30 to members 54 and extends through members 52 and 54. As shown in FIG. 4, the connecting means 44 connecting the ramp 18 and support members 42 extends through support member 42 and the longitudinal braces 52 and 54.

In the preferred embodiment the track 46 comprises two inwardly opening channels 46' which are rigidly attached to the lower surface of the truck bed and extend from the rear end 38 of the truck bed 12 toward the front thereof. Preferably track 46, as shown in FIGS. 2 and 3, terminates substantially at the vertical plane containing the end 38 of bed 12.

Twin support members 42, in the preferred embodiment are outwardly opening channel members 60 containing a spacer member 62 which extends the length thereof. Channel members 60 are dimensioned to be slidably retained within the internal confines of the rail members 46' of track 46. The ramp 18 and pivotal connection 44 act to retain supporting members 42 in rail members 46'. If desired, a spacer member 64 may be mounted between the ends of said supporting members 42 opposite the pivotal connection 44. Spacer member 64 may be attached by any conventional means to members 42. Ramp 18 and spacer members 64 then coact to retain supporting members 42 in rail members 46' permitting only longitudinal movement of members 42 in rails 46'.

When the ramp 18 is disposed in the storage area defined by rail members 46' the forward end of the ramp will be retained in the storage area by connecting means 44 connecting ramp 18 and support members 42. The rear end 40 of ramp 18 may be retained between rail members 46' by any conventional detachable means such as a rod adapted to pass through a hole 70 in track 46, as shown in FIG. 1, and hole 72 shown in FIG. 2 adjacent the rear end 40 of ramp 18. The rod passing through hole 70 and 72 in rail members 46 and supporting members 52 and 54 may be retained therein by any conventional means (not shown) such as by a cotter pin or by threaded attachment to a stop member.

When the ramp is retained in the storage area as shown in FIG. 2, the sidewall members 20 may be attached to the sides of the truck 14 by any conventional means such as by the S-shaped hangers 76 shown in FIG. 7, or by wing nuts 78 as shown in FIG. 8.

To assemble the chute of this invention into the loading position shown in FIGS. 1 and 3 the rod (not shown) is removed from holes 70 and 72 and the rear end 40 of ramp members 18 is grasped and pulled. Ramp 18 is then withdrawn from track 46. When the ramp 18 is fully withdrawn supporting members 42 will extend a predetermined distance from the ramp 18 into the rail members 46'. Because the pivotal connection 44 is disposed between the forward end of ramp member 36 and the center of gravity thereof, the weight of ramp 18 will cause the ramp to pivot about connection 44 until the forward end 36 abuts the rear end 38 of the truck bed 12, and the rear end 40 of ramp 18 rests on the ground. Sidewalls 20 are then detached from the truck sides 14 and tab members 28 inserted in sleeves 30. Uprights 22 are then pivoted relative to the ramp 18, about the connecting means 26, connecting the lateral supports 24 and the uprights 22, and sleeve 30 is thereby pivoted about connecting means 32 until uprights 22 are disposed perpendicular to the horizontal plane containing the truck bed 12, as shown in FIG. 1.

To disassemble the loading chute of this invention uprights 22 are pivoted into a position perpendicular to ramp 18 and sidewalls 20 are lifted, withdrawing tabs 28 thereon from rectangular sleeves 30. Sidewalls 20 are then attached to the side 14 of the truck 10 as shown in FIG. 1.

By pivoting uprights 22 rectangular sleeves 30 are also pivoted about bolts 32 from the position shown in FIG. 3 to the position shown in FIGS. 2 and 5 wherein the vertical axis of sleeve 30 is perpendicular to the longitudinal axis of the ramp 18. The rear end 40 of ramp 18 is then raised until the ramp 18 has pivoted about connecting means 44 from the inclined position of FIG. 1 to a position wherein the longitudinal axis of ramp 18 coincides with the longitudinal axes of track 46. Ramp 18 is then pushed into track 46 causing supporting members 42 to slide therealong until the end 40 of ramp 18 lies within track 46 as shown in FIG. 2. The rear end 40 is retained in the storage area defined between the rail members 46' of track 46 by any conventional means such as by passing a rod (not shown) through hole 70 in rail members 46 and hole 72 in brace members 52 and 54.

It will be appreciated by those skilled in the art that a wide variety of different types of brace members and support members may be utilized within the scope of this invention. In addition, the means described above for attaching the sidewall members to the ramp and for attaching the sidewall members to the truck sides are preferred embodiments only, and any conventional type of detachable mounting means is contemplated within the scope of this invention. It will be also obvious to those skilled in the art that the ramp of this invention may be utilized alone to load a truck without mounting sidewalls 20 thereon. In addition, the truck may be parked adjacent a tree or building, and in this instance a single sidewall may be sufficient to assemble the chute of this invention for loading livestock.

Although the dimensions of the component parts of the loading chute of this invention may be varied without departing from the intended scope thereof, it must be emphasized that the supporting members 42 must be long enough so that a substantial portion thereof will be retained in the track 46 when ramp 18 is assembled in the loading position. In a preferred embodiment of this invention wherein the pivotal connection is spaced on ramp 18 approximately 16 ½ inches from the forward end 36, supporting members 36 inches in length will provide sufficient support in track 46 for the chute of this invention.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A retractable loading chute for a truck comprising:
   a track including a pair of elongated rail members, said members defining a storage space therebetween, said track adapted to be carried under the bed of said truck and disposed longitudinally thereto, extending from the rear toward the front of the bed;
   a pair of mutually spaced support members slidably mounted in said track;
   means cooperating between said support members and said track for retaining said members in said track;
   a ramp disposed between said support members and carried thereby, said ramp being movable relative to said track between a retracted position wherein said ramp is disposed in the storage space between said rail members and a loading position wherein said ramp is fully withdrawn from the storage space, said ramp having front and rear ends, the planes containing said ends being disposed at angles to the longitudinal axis of said ramp;
   pivotal connecting means connecting a portion of said ramp longitudinally spaced from the front end toward the center thereof and said support members, for permitting pivotal movement of said ramp relative to said support members into the loading position when said ramp is withdrawn from the storage space, so that when said ramp is withdrawn from the storage space and the front portion of said members are retained therein said ramp will pivot about said supporting members into the loading position wherein the rear end of said ramp rests on the ground and the front end thereof abuts the rear end of the truck bed.

2. The device of claim 1 further comprising releasable means cooperating between said ramp and said track for retaining said ramp in the storage space when said ramp is in the retracted position.

3. The device of claim 1 wherein said track includes a pair of inwardly opening channels mutually spaced in parallel relationship.

4. The device of claim 3 wherein said supporting members are slidably received in said channels.

5. The device of claim 4 wherein said supporting members include outwardly opening channels, each of said supporting channels being received in a rail channel for sliding movement relative thereto.

6. The device of claim 5 further comprising spacer means connecting said supporting channels for retaining said supporting members in said rail channels.

7. The device of claim 1 further comprising sidewalls adapted to be mounted on said ramp when said ramp is in the loading position; mounting means carried by said ramp for mounting each of said sidewalls at a side of said ramp.

8. The device of claim 7 wherein each of said sidewalls comprise a plurality of mutually spaced upright supports and a plurality of mutually spaced lateral supports; means pivotally connecting said lateral supports and said upright supports for permitting movement of said uprights when said walls are mounted on said ramp and said ramp is in the loading position from a first position wherein said uprights are disposed perpendicular to said ramp to a second position wherein said uprights are disposed perpendicular to the plane containing the truck bed.

* * * * *